Patented Oct. 15, 1946

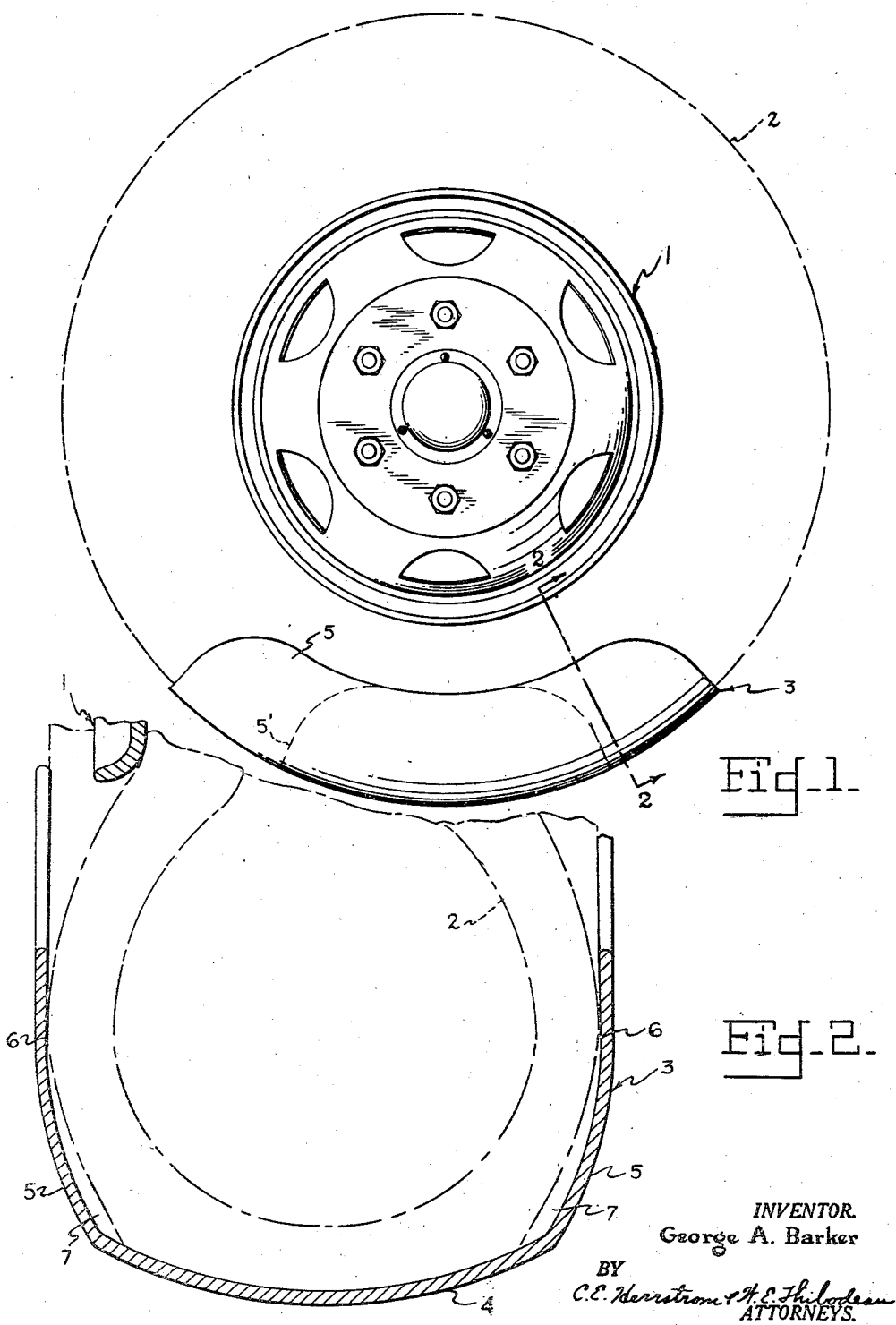

2,409,182

UNITED STATES PATENT OFFICE 2,409,182

TIRE SHOE

George Arthur Barker, Rochester, N. Y.

Application July 12, 1943, Serial No. 494,321

2 Claims. (Cl. 152—151)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel tire shoe for the purpose of reducing or substantially eliminating the elasticity of a pneumatic tire at the ground engaging portion thereof when subject to impact in a stationary position. A mobile gun mount is an example of a vehicle for which the devise is intended. The recoil of the gun normally causes a downward compression and a lateral expansion of the tires, followed by an undesirable, sharp bounce or jolting of the wheeled mount. The invention is also useful in connection with vehicles carrying other reactive apparatus such as rocket projectors, pumping equipment, wrecking trucks and the like.

The device consists essentially of an arcuate channel member of metal or other similar rigid material and adapted to receive the tire over an extent of approximately 45 to 100 degrees. The side walls of this member or shoe are designed to engage the side walls of the tire. The tire is thus restrained from expanding laterally and hence from being contracted radially when the vehicle is subjected to a sharp downward impact. Consequently, the bounce that would normally result from such temporary deformation of the tire is also eliminated.

The invention is fully disclosed by way of example in the following description and in the accompanying drawing in which:

Figure 1 is a side elevation of a wheel having its tire equipped with a shoe according to the invention, and Figure 2 is a section on the line 2—2 of Figure 1.

Reference to these views will now be made by use of like characters which are employed to designate corresponding parts throughout.

In the figures is shown a conventional motor vehicle wheel 1 equipped with a pneumatic tire 2 in the usual manner. The vehicle may be a gun mount or a carrier of any of the apparatus mentioned above and not illustrated inasmuch as the invention pertains only to the shoe applied to the tire. At least two of the wheels, and preferably all of the wheels, are so equipped.

The shoe is a channel shaped member 3 of rigid construction, arcuate lengthwise as shown in Figure 1 and substantially arcuate transversely as shown in Figure 2. In order to secure the desired and the necessary rigidity, the shoe is preferably in the form of a steel stamping, although it may be cast or forked or conceivably made of a non-metallic material such as vulcanized rubber or a hard and inelastic plastic. The bottom or ground-engaging wall 4 of the channel has a large radius of curvature to conform with the corresponding tread of the tire. The side walls 5 are shaped near their free edges to engage a substantial area of the side walls of the tire, as indicated by the numeral 6. Between the walls 5 and each area 6, the shoe may or may not be so shaped as to allow a clearance 7 with the outer edges of the tire shoe of the walls. The purpose of the clearance 7 is to make allowance for dirt which may cling to the tire and which may prevent the shoe from making a firm contact with the tread surface of the tire.

In height or radial dimension, each channel wall side engages slightly more than half of the embraced tire side wall, as may be seen in Figure 1. The arcuate extent of the shoe may vary approximately between 45 and 100 degrees from end to end, the smaller dimension being shown in dotted lines and indicated by the numeral 5'.

In use the shoe is fitted on an upper portion of the tire. This may be done manually without displacing the tire. The vehicle is then rolled so that the shoe engages the ground, occupying the relative position shown in Figure 1. The brakes of the vehicle are then set.

The impact on the vehicle from any of the causes previously stated tends to compress the tire radially and expand it laterally at the ground. Such distortion is, however, prevented by the restraining action of the walls 5 on the areas 6 on the tire side walls. Consequently, the bounce that would follow such distortion is also avoided.

The relative dimensions of various parts of the shoe, as previously described, are such as to distribute the pressure over a large area and thus avoid damage to the tire. Moreover, some yielding of the tire may occur in the clearance 7 without resulting in a bounce.

Although a specific embodiment of the invention has been illustrated and described, it will be understood that various alterations in the details on construction may be made without departing from the scope of the invention as indicated by the appended claims.

What I claim is:

1. In combination, a pneumatic tire adapted to support a predetermined normal load and when stationary upon the ground adapted to be temporarily deformed by a series of downwardly directed impacts by said load, said downward impacts by said load being transmitted to the ground through a sector of the tire engaging the ground and said temporary deformation consisting of the tire being compressed substantially in a radial direction to vary progressively the length of contact between the periphery of the sector engaging the ground and the ground itself and to bulge laterally the tire side walls joining said sector, an anti-bounce shoe engaging the same circumferentially and continuously thereof a distance substantially equal to the maximum length of the peripheral ground contact during said impacts, said shoe comprising a bottom wall having a smooth ground-contacting surface and straight side walls connected thereto, said bottom wall being concentric with the periphery of, and said side walls being spaced apart a distance substantially equal to the widest part of, said tire when under said normal load and not temporarily deformed by said impacts, said widest part being measured along a line taken transversely through the tire and parallel to the axis of rotation thereof, whereby said shoe is secured to said tire solely by friction to restrain said tire during said impacts from being temporarily deformed and thereby substantially reduce radial compression and thus bounce of the tire during the impacts.

2. An anti-bounce shoe for a pneumatic tire adapted to support a predetermined normal load and when stationary upon the ground adapted to be temporarily deformed by a series of downwardly directed impacts by said load, said downward impacts by said load being transmitted to the ground through a sector of the tire engaging the ground and said temporary deformation consisting of the tire being compressed substantially in a radial direction to vary progressively the length of contact between the periphery of the sector engaging the ground and the ground itself and to bulge laterally the tire side walls joining said sector, said shoe adapted to engage said ground-engaging sector circumferentially and continuously thereof a distance substantially equal to the maximum length of the peripheral ground contact during said impacts, said shoe comprising a bottom wall having a smooth ground-contacting surface and a plurality of straight side walls connected thereto, the upper inner portions of said shoe side walls being spaced apart a distance substantially equal to the widest part of said tire when under said normal load and not temporarily deformed by said impacts, said widest part being measured along a line taken transversely through the tire and parallel to the axis of rotation thereof, whereby said shoe may be applied to a portion of the tire not engaging the ground and held on said tire solely by friction, the outer portions of said shoe side walls adjacent the bottom wall being spaced apart a distance greater than that of the upper inner portions to provide clearance between said outer portions and tire side walls to prevent accumulated foreign matter, adhering to the outer portions of said tire side walls, from interfering with said frictional engagement, said bottom wall having portions substantially concentric with the peripheral and transverse curvatures of the tread of the tire upon which it is to be attached and while said tire is under said predetermined normal load and not subjected to said impacts, said shoe adapted to be positioned beneath the tire by first applying the shoe to a portion of the tire not engaging the ground and then wheeling the tire to place the shoe in contact with the ground, said shoe thus restraining the tire side walls from lateral bulging in said ground-engaging sector thereof thereby to reduce substantially the radial compression and thus bounce of the tire during said impacts.

GEORGE ARTHUR BARKER.